US008296861B2

(12) United States Patent
Gerton

(10) Patent No.: US 8,296,861 B2
(45) Date of Patent: Oct. 23, 2012

(54) POLARIZATION-MODULATED TIP ENHANCED OPTICAL MICROSCOPE

(75) Inventor: Jordan M. Gerton, Salt Lake City, UT (US)

(73) Assignee: University of Utah Research Foundation, Salt Lake City, UT (US)

(*) Notice: Subject to any disclaimer, the term of this patent is extended or adjusted under 35 U.S.C. 154(b) by 160 days.

(21) Appl. No.: 12/536,974

(22) Filed: Aug. 6, 2009

(65) Prior Publication Data

US 2010/0132079 A1    May 27, 2010

Related U.S. Application Data

(60) Provisional application No. 61/087,566, filed on Aug. 8, 2008.

(51) Int. Cl.
    *G01Q 60/24*    (2010.01)
(52) U.S. Cl. .......................................... 850/33
(58) Field of Classification Search ............... 850/33
    See application file for complete search history.

(56) References Cited

U.S. PATENT DOCUMENTS

| 5,939,709 A * | 8/1999 | Ghislain et al. ............... 250/216 |
| 6,144,028 A * | 11/2000 | Kley .............................. 250/234 |
| 6,953,927 B2 | 10/2005 | Quake et al. |
| 7,247,842 B1 | 7/2007 | Quake et al. |

* cited by examiner

*Primary Examiner* — Michael Maskell
*Assistant Examiner* — Hanway Chang
(74) *Attorney, Agent, or Firm* — Workman Nydegger

(57) ABSTRACT

Methods and systems for improving high resolution imaging using a polarization-modulated tip enhanced optical microscope. A polarizer is configured to alternately create and remove a region of enhanced optical intensity adjacent the tip of the microscope probe at the focus of a light source. The sample being studied emits photons at specific rates relative to a background rate depending on the existence or nonexistence of the region of enhanced optical intensity. Comparing the rate of emissions when the region of enhanced optical intensity exists to when it does not creates a detailed image of the sample. By not requiring the probe to oscillate, this system enhances the resolution of the microscope without potentially causing damage to the sample.

25 Claims, 6 Drawing Sheets

POLARIZATION-MODULATED TIP ENHANCED OPTICAL MICROSCOPE

CROSS-REFERENCE TO RELATED APPLICATIONS

This application claims priority to and the benefit of U.S. Provisional Patent Application No. 61/087,566 filed Aug. 8, 2008, entitled POLARIZATION-MODULATED TIP ENHANCED OPTICAL MICROSCOPE, which is incorporated by reference herein.

STATEMENT AS TO RIGHTS TO INVENTIONS MADE UNDER FEDERALLY SPONSORED RESEARCH OR DEVELOPMENT

This invention was made with government support under grant DBI-0845193 awarded by the National Science Foundation. The U.S. Government has certain rights to this invention.

BACKGROUND OF THE INVENTION

1. The Field of the Invention

The present invention relates generally to optical microscopy. More particularly, the invention relates to a polarization-modulated tip enhanced optical microscope.

2. The Relevant Technology

Microscopy is the technical field of using microscopes to view samples or objects. There are three well-known branches of microscopy: optical, electron, and scanning probe. Optical and electron microscopy involve the diffraction, refraction, or reflection of electromagnetic radiation incident upon the subject of study, and the subsequent collection of this scattered radiation in order to build up an image of the subject. This process may be carried out by wide field irradiation of the sample (for example, standard light microscopy and transmission electron microscopy) or by scanning of a fine beam over the sample (for example, confocal microscopy and scanning electron microscopy). Scanning probe microscopy involves the interaction of a scanning probe with the surface or object of interest. The development of microscopy revolutionized biology and remains an essential tool in that science, along with many others.

Optical or light microscopy involves passing light transmitted through or reflected from the sample through a single lens or multiple lenses to allow a magnified view of the sample. More specifically, as light, such as a laser beam, is focused through a lens and onto a sample, the sample fluoresces. That is, as the light is directed onto the sample, the sample absorbs the light and emits light of a different wavelength. The resulting light can be detected directly by the eye, imaged onto a photographic plate, or captured digitally. The single lens with its attachments or the system of lenses and imaging equipment along with the appropriate lighting equipment, sample stage and support make up the basic light microscope.

While optical microscopy provides many benefits in imaging a sample, the resolution achieved with standard optical microscopy is limited. In particular, because standard optical microscopy uses light to image a sample, structures or features of the sample that are smaller than about half the wavelength of the light focused on the sample cannot be imaged. In biological samples, for example, the focused light is usually within the visible range of light, i.e., 500 to 800 nanometers. This means that sample structures or features that are smaller than 250 to 400 nanometers cannot be resolved or imaged using standard optical microscopy.

Many solutions have been designed to overcome these inherent limitations of the optical microscope, including tip-enhanced fluorescence microscopy ("TEFM"). TEFM is a type of apertureless near field scanning optical microscope ("ANSOM") that utilizes fluorescence to generate an image. By aligning the sharp tip of a probe into the focus of a laser beam with axial polarization, enhanced fields are generated at the apex of the tip where the intensity of light is significantly greater than without the probe, analogous to a lightning rod. This field enhancement is tightly confined to the vicinity of the tip apex and has been shown to decay rapidly as $r^{-6}$ with distance r from the tip apex. Therefore, light intensity measurements even a few nanometers away from the tip are lower than those at the tip and are about the same as if the tip were not present.

Once the high intensity region is created, it can be used to image nanometer scale features of a sample. When this technique is used to scan and image a sample, a background image is created. The background image is created by the light that is directed onto the sample away from the high intensity light region. This image is the same image that would be achieved by using a standard optical microscope without the addition of the probe tip, and thus the resolution is limited by diffraction. In addition to the background image, however, the high intensity region provides a greater detailed image of the sample within the high intensity region. As the sample is scanned, the more detailed image is superimposed on the background image, thereby providing a more detailed image of the complete sample.

The high intensity region enables information to be obtained about the distribution, structures, and features of the sample with much better resolution. In fact, the resolution is independent of the wavelength of the laser beam, and is only dependent on the size of the high intensity region. The size of the high intensity region is determined by the sharpness of the probe tip. In this manner, resolution can be achieved down to about 10 nanometers, thereby overcoming the diffraction limit discussed above by a factor of about 25.

The above identified modified optical microscope works well for imaging isolated molecules or particles on a surface when the molecules or particles are farther apart on average than the size of the laser beam. When they are close together and within the laser beam focus, the background signal goes up because each molecule or particle is fluorescing. However, because the region of higher intensity near the tip is so tightly localized, only one of the molecules or particles experiences the elevated field near the end of the tip. Thus, the more dense the sample is, the more molecules or particles there are within the laser focus, thereby reducing the image contrast because there is only one molecule that is being affected with the high intensity region near the tip, but there are many molecules within the laser that increase the background signal.

In response to problems associated with this poor contrast, methods for increasing the contrast between the background signal and that of the high intensity region have been developed. For example, in some applications, the probe tip is rapidly vibrated in and out of the region containing the sample to, in essence, rapidly modulate the detected signal. When the tip is moved close to the sample, the high intensity region at the tip's apex causes an increase in the detected signal. In contrast, when the tip is moved away from the sample, the signal returns to the background level. Any sample molecule within the high-intensity region will experience the higher intensity light, and the signal collected from that molecule will increase. However, the molecules outside of the higher intensity region, but within the area illuminated by the laser, will not experience the higher intensity light and the signal collected from them will, therefore, be the same as that resulting from the normal laser beam. In contrast, when the probe tip is moved away from the sample region, the high intensity region is removed from the single molecule, and the signal collected from that single molecule then returns to its normal level resulting from the laser beam.

In other words, oscillating or vibrating the tip quickly above the sample causes one molecule that is close to the tip to "blink" or fluctuate its fluorescence rate at the same rate that the tip is being oscillated. While one molecule within the high intensity region blinks, the signals given by molecules that are not close to the tip, but which are still within the laser focus, remain unchanged. Therefore, rather than detecting how much light is given off by a sample, the amount of "blinking" by each molecule is detected. In this manner the background signal can be suppressed while focusing on the one blinking molecule.

While oscillating the tip causes a molecule to blink, the blinking of the molecule is sensitive to the amplitude of the tip's oscillation. If the oscillation amplitude is too small then the fluctuation or blinking of the molecule is too small to detect or separate from the background signal. However, if the oscillation amplitude is too large, then the fluctuations or blinking will only occur for a brief period of time, that fraction of the oscillation period whereby the tip is close to the sample. Thus, there is an optimum oscillation amplitude for the tip. A limitation of the tip-oscillation method summarized above is that this optimum oscillation amplitude is rather large, (~40 nm), which is sufficiently large as to possibly cause damage or unwanted perturbations to very soft samples, such as the thin membranes that envelope a cell or various organelles within the cell. This limits the utility of the technique when applied to a number of very important biological systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

The present invention relates generally to high resolution optical microscopy techniques. More particularly, the invention provides a system for improved high resolution scanning using a polarization-modulated tip enhanced optical microscope. It would be recognized that the invention has a broad range of applicability. For example, this invention can be applied with apertureless near field scanning optical microscopes that image samples with various scattering processes, including one- and two-photon fluorescence, Raman scattering, infrared spectroscopy, and Rayleigh scattering. Moreover, the scanned samples can be from a variety of different fields such as biology, electronics, semiconductors, organic chemistry, life sciences, biotechnology, nanotechnology, molecular and biological circuits, and others.

A system for improved high resolution scanning according to exemplary embodiments of the present invention uses a polarization-modulated tip enhanced microscope to selectively generate and remove a high intensity light region near the probe tip. This invention can turn the region of high intensity light off and on without oscillating the probe tip in and out of the focus of the light source, or toward and away from the sample surface. One advantage of this system is that no damage is done to sensitive samples by the oscillations of the polarization-modulated tip.

An optical microscope according to this invention comprises a light source adapted to generate and emit light, a probe tip with a longitudinal axis that is disposed within the path of the light from the light source, a lens disposed between the light source and the probe tip that is configured to focus the light from the light source onto the probe tip, and a means for changing a polarization of the light from the light source. When the means for changing the polarization of light alternates between a polarization substantially aligned with the longitudinal axis of the probe dip and a polarization traverse to the longitudinal axis of the probe tip, the light will alternately create and remove a region of high intensity light adjacent an end of the probe tip.

An optical microscope system according to another embodiment of this invention comprises a cantilever with a probe tip coupled to a piezo-electric stack, a light source adapted to emit light, a stage disposed beneath the cantilever, a photodiode configured to receive emitted light from a sample, an objective lens disposed beneath the stage that is configured to focus the light from the light source onto the probe tip, a dichroic mirror aligned to both direct the light from the light source through the objective lens by reflection and to transmit emitted photons from the sample to the photodiode, and a light polarization device adapted for changing a polarization of the light from the light source. When the light polarization device alternates between a polarization substantially aligned with the longitudinal axis of the probe tip and a polarization transverse to the longitudinal axis of the probe tip, the light will alternately create and remove a region of high intensity light adjacent to the end of the probe tip.

According to another embodiment of this invention, a method for imaging microscopic objects using detection of photons emitted from the objects is disclosed. The method comprises: first, locating a tip of a probe near a sample to influence a rate of emission of electromagnetic energy from the sample; second, focusing light adjacent the tip of the probe; and third, alternating the polarization of the light between a direction substantially aligned with the longitudinal axis of the probe tip and a direction that is generally transverse to the longitudinal axis of the probe tip in order to alternately create and remove a region of high intensity light adjacent the tip of the probe.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates generally to high resolution optical microscopy systems and techniques. More particularly, the invention provides a system for improved high resolution scanning using a polarization-modulated tip enhanced optical microscope. It would be recognized that the invention has a broad range of applicability. The present invention can be configured to resolve features of a sample on the nanometer scale. Additionally, the present invention can be used to identify different kinds of molecules based on the spectra of light emitted by the molecules when a light is directed onto the sample. The emitted light spectra can be used to identify various features, structures, and characteristics of the sample, even if the sample is a single molecule. Moreover, the present invention maintains most, if not all, of the advantages of using light to image structures, while achieving greater resolution of the sample without being limited by the wavelength of the light used to image the sample or without damaging the sample.

Figure 1:
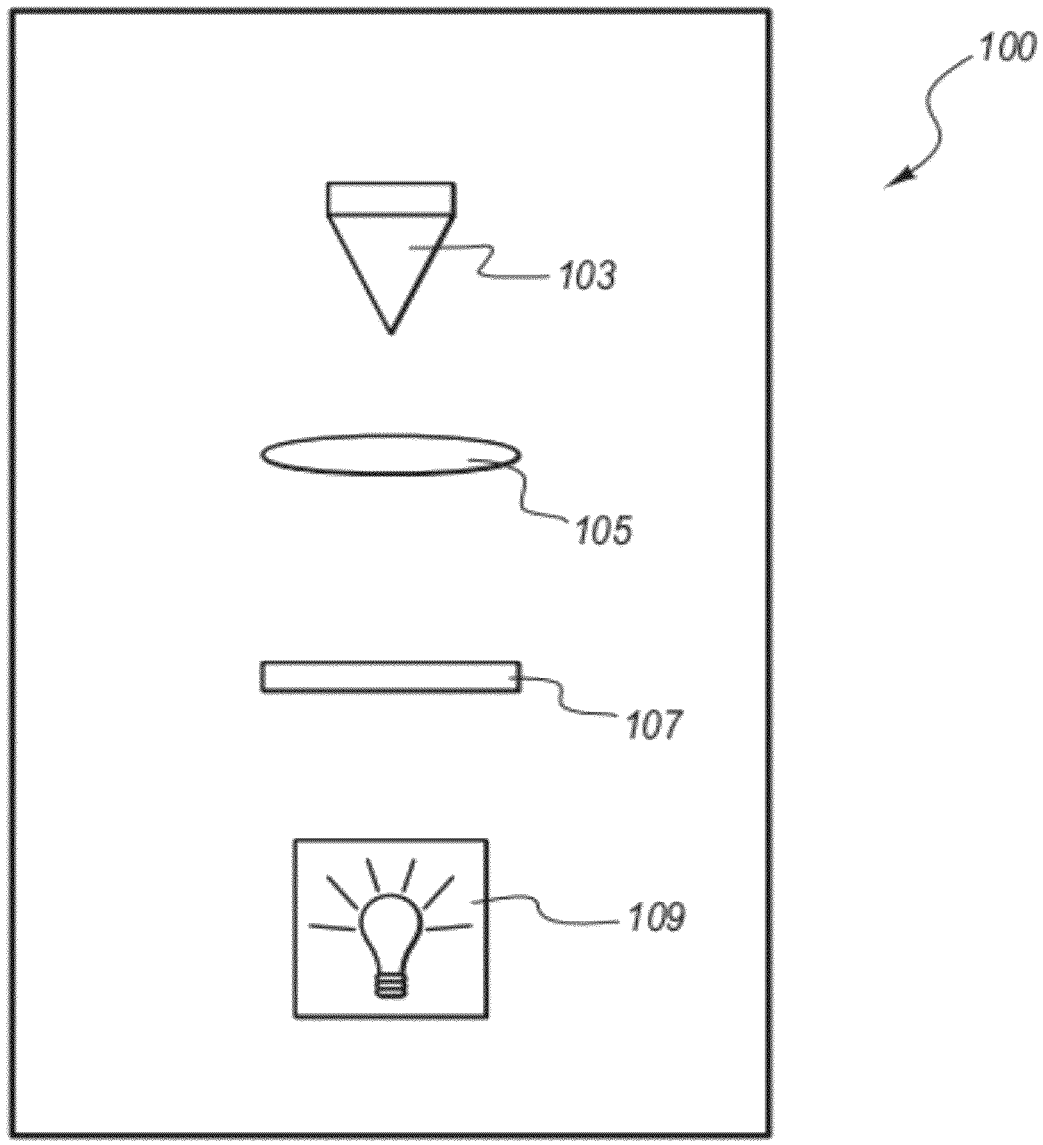
FIG. 1 illustrates a schematic representation of an optical microscope system according to an exemplary embodiment of the present invention.

Depicted in FIG. 1 is a schematic diagram of an optical microscope system 100 according to an exemplary embodiment of the present invention. The embodiment illustrated in FIG. 1 is merely exemplary and is not intended to limit the scope of the present invention. Rather, one of ordinary skill in the art will appreciate that modifications, alternatives, and variations can be made to the embodiment of FIG. 1 without departing from the scope of the present invention.

As shown, the present optical microscope system 100 includes a probe tip 103, a lens 105, a polarizer 107, and a light source 109. In an exemplary embodiment, light source 109 comprises a laser. Light source 109 may alternatively comprise one or more lasers, light bulbs, xenon arc lamps, mercury-vapor lamps, and the like. Lens 105 is disposed between light source 109 and probe tip 103 such that lens 105 focuses the light from light source 109 adjacent probe tip 103. Disposed between lens 105 and light source 109 is polarizer 107. Polarizer 107 can be any suitable structure or device that can change the polarization of the light from light source 109. By way of non-limiting examples, polarizer 107 can include a Pockels cell, a liquid crystal device, a retarder, a crystal, a combination thereof, or any other structure(s) or device(s) known in the art that is able to change the polarization of light. The aforementioned polarizers can comprise and function as means for changing a polarization of the light from light source 109.

Polarizer 107 is configured to alternate the polarization of the light from light source 109 between a direction generally aligned with an axis of probe tip 103 (referred to herein as longitudinal polarization) and a direction that is generally transverse to the axis of probe tip 103 (referred to herein as transverse polarization). When the light from light source 109 has a generally longitudinal polarization, a region of enhanced light intensity is created adjacent to an end of probe tip 103. In contrast, when the light from light source 109 has a generally transverse polarization, no region of enhanced light intensity is created adjacent to the end of probe tip 103.

In some exemplary embodiments, such as those illustrated in the Figures, the relevant axis of probe tip 103 that is used, in conjunction with the polarization of the incident light, to create the region of enhanced light intensity is a longitudinal axis of the probe tip. In the illustrated embodiments, probe tip 103 is illustrated as being elongated with a longitudinal axis of probe tip 103 being generally perpendicular to the sample plane. It will be appreciated, however, that probe tip 103 can be configured in any number of ways without departing from the spirit and scope of the present invention. For instance, rather than having a pyramidal or other pointed shape that has a longitudinal axis that is perpendicular to the sample plane, probe tip 103 can have a spherical shape. When probe tip 103 has a spherical shape, changing the polarization of the light from light source 109 between longitudinal and transverse polarizations can change the location of the region of enhanced light intensity. For instance, when the light from light source 109 has a longitudinal polarization, a region of enhanced light intensity is created at the lower pole of the probe tip near the sample. When the polarization is changed to a transverse polarization, the region of enhanced light intensity is shifted from the pole to the equatorial plane of the spherically shaped probe tip.

In light of the disclosure herein, it will be understood that probe tip 103 can be shaped and configured in any suitable manner that allows for the creation and removal of a region of enhanced light intensity as the polarization of the incident light is changed. Thus, the systems and methods of the present invention are generally directed to creating and removing a region of enhanced light intensity near a probe tip and sample in order to image the sample. The specific configuration of the probe tip and the specific polarizations of the incident light are not critical. Rather, present invention is directed to using any probe tip that can cooperate with changing polarizations of light to create and remove the region of enhanced optical intensity, regardless of the specific configuration of the probe tip and the polarizations of the light. Thus, in some embodiments, the region of enhanced light intensity is created when the light's polarization is aligned with a longitudinal axis of the probe tip and removed when the polarization is transverse to the longitudinal axis of the probe tip. In other embodiments, however, the probe tip may be configured to create the region of enhanced light intensity when the light's polarization is transverse to an axis of the probe tip and remove the region when the polarization is aligned with the axis of the probe tip. In still other embodiments, the polarization of the light may create and remove the region of enhanced light intensity without regard to any axis of the probe tip. Therefore, while some embodiments are described herein with polarizations being aligned with or transverse to an axis of the probe tip, it will be appreciated that such descriptions are exemplary only, and not limiting of the scope of the present invention.

It is not required that light source 109 and polarizer 107 be disposed immediately beneath lens 105. Instead, in a specific embodiment of the invention, a combination of lenses and mirrors are used to direct the light from light source 109 through polarizer 107 and then subsequently through lens 105. In one embodiment, the combination of lenses and mirrors includes a beam splitter to split the light from light source 109, directing only a part of the light through lens 105. In a separate embodiment the combination of lenses and mirrors includes a dichroic lens which adjusts the light so as to direct it through lens 105.

In an exemplary embodiment, lens 105 is a single lens that focuses the light from light source 109 onto probe tip 103. However, lens 105 may comprise one or more lenses, and may even comprise a complex objective lens.

In an exemplary embodiment, probe tip 103 has a pyramidal shape and the tip of the pyramid is coated with silver particles. However, other particles or coatings can also be used. For example, such coatings include, among others, semiconductors (e.g., silicon, silicon nitride, diamond, etc.), conductors (e.g., platinum, gold, silver alloys, aluminum, platinum-irridium, cobalt and other metals as well as materials doped to be conductive), as well as other combination of these, and the like.

Exemplary embodiments of the present invention employ standard optical microscopes with a probe tip positioned within the focused laser beam as described elsewhere herein to create a high intensity light region adjacent to a sample. However, rather than oscillating the probe tip in and out of the laser beam, or toward and away from the sample surface, to create the high intensity light region near the sample, the present invention is directed to creating the high intensity light region without significant oscillations of the probe tip. Nonetheless, the present invention may be accomplished even if the probe tip is oscillated.

To create the high intensity region near the end of the probe tip, the polarization of the focused laser beam is aligned with the axis of the probe tip. If the polarization is rotated so that it is generally transverse to the axis of the probe tip, as illustrated in FIG. 2A, then the high intensity region will not exist.

Therefore, even if the probe tip is not oscillated above the sample, but the polarization of the laser beam is rotated from a first polarization to a second polarization, the high intensity region is created and removed from above the sample. Thus, the high intensity region can be controlled through modulating the polarization of the laser beam. As the polarization is modulated, the signal from the single molecule that is near the tip modulates or blinks at the same rate as the polarization.

The above described method for creating and removing the high intensity region does not require large oscillation amplitudes of the probe tip. In fact, the method does not require any oscillation of the tip at all. While no oscillation is required, small oscillations of the probe tip are acceptable. Eliminating oscillations of the probe tip, or at least minimizing their amplitudes, reduces the likelihood of damaging soft samples. Thus, using the methods and devices of the present invention enables the blinking of sample molecules so that the background signal from the rest of the sample molecules can be suppressed.

In an exemplary embodiment of the invention, polarizer 107 comprises a Pockels cell, although polarizer 107 alternatively can comprise multiple Pockels cells, a liquid crystal device, a retarder, a crystal, or any other structure or device known in the art that is able to change the polarization of light. A Pockels cell can be used to rotate the laser beam polarization between a first polarization and a second polarization. A Pockels cell has a crystal with some birefringence which gives it the ability to rotate the polarization of light. However, the ability to rotate the polarization is dependent on an electric field that is applied across the crystal. As a laser beam propagates through the crystal, its polarization can either be rotated or not depending on the presence and size of a voltage applied across the crystal. As the presence or size of the voltage across the crystal is changed, the polarization of the light passing through the crystal is rotated. The voltage across the crystal can be changed relatively quickly, thereby allowing the polarization of the laser beam to be changed relatively quickly.

Thus, the polarization of a laser beam can be rotated 90 degrees simply by switching on and off or changing the voltage across the crystal. In some embodiments, the voltage across the crystal, and hence the polarization of the laser beam, can be changed in less than a nanosecond. As the polarization of the laser beam is rotated, the high intensity region near the probe tip turns on and off, thereby causing the molecule close to the tip to blink as describe herein. The blinking, or fluctuation in signal, from the molecule close to the probe tip enables the nanometer-sized features of the sample to be more clearly imaged because the background signal can be suppressed and the sample is not damaged during the imaging process.

In one exemplary embodiment, the sharp probe tip 103 comprises an atomic force microscope ("AFM"). The AFM can be of the type referred to as tapping mode (intermittent-contact), contact mode, lateral force mode, or noncontact mode. However, other types of microscopes can be used in conjunction with the present invention, including other types of scanning probe microscopes such as scanning tunneling microscopes (STM) and near-field scanning optical microscopes (NSOM).

Figure 2B:
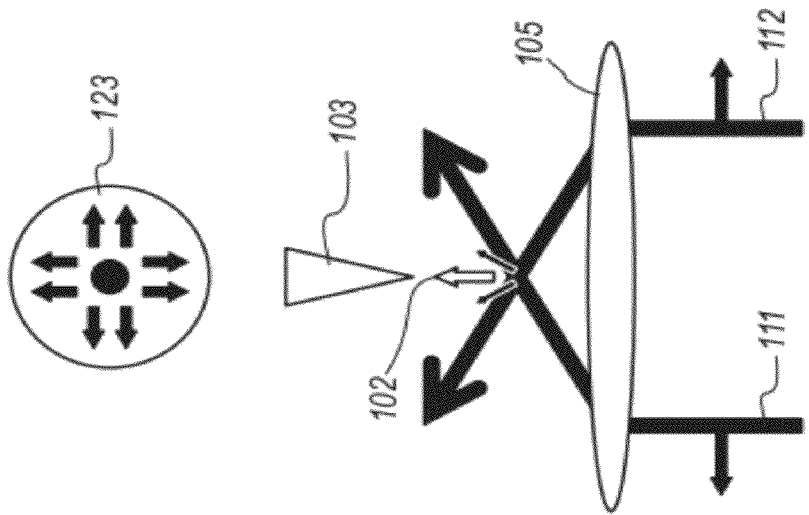
FIG. 2B illustrates the optical microscope system of FIG. 2A with two peripheral light rays having different polarizations being passed through a lens and focused adjacent a probe tip and the resultant polarization of the focused light.
Figure 2A:
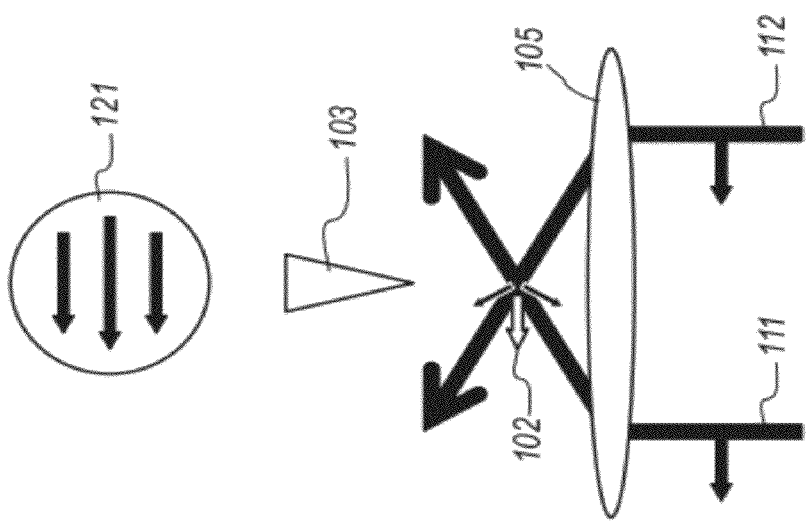
FIG. 2A illustrates an optical microscope system with two peripheral light rays, each having a particular polarization, being passed through a lens and focused adjacent a probe tip and the resultant polarization of the focused light.

FIGS. 2A and 2B are more detailed illustrations of the resulting light polarizations when light beams of particular polarizations from a light source (not shown) are focused through lens 105 adjacent probe tip 103. In FIG. 2A, the incoming light rays 111 and 112 have commonly oriented linear polarizations, as seen at the top of FIG. 2A in a depiction of a cross section of a beam of light 121. After rays 111 and 112 are focused by lens 105 adjacent probe tip 103, the resulting polarization is generally transverse to the longitudinal axis of probe tip 103, as demonstrated by arrow 102. Because the polarization of the focused light is generally transverse to the longitudinal axis of probe tip 103, a region of enhanced optical intensity adjacent the probe tip 103 is not created.

In FIG. 2B, however, the incoming light rays 111 and 112 have radial polarization, as seen at the top of FIG. 2A in a depiction of a cross section of a beam of light 123. After rays 111 and 112 are focused by lens 105 adjacent probe tip 103, the resulting polarization is along the longitudinal axis of the probe tip 103, as demonstrated by arrow 102. The alignment of the resulting polarization and the longitudinal axis of probe tip 103 creates a region of enhanced optical intensity as described previously herein.

Thus, in this embodiment, where the light incident on probe tip 103 through the lens is radially polarized, a region of enhanced optical intensity is created. By periodically switching between radial polarization and another form of polarization that does not create a region of enhanced optical intensity, such as linear polarization, the high resolution optical scanning described herein can be achieved.

Figure 3B:
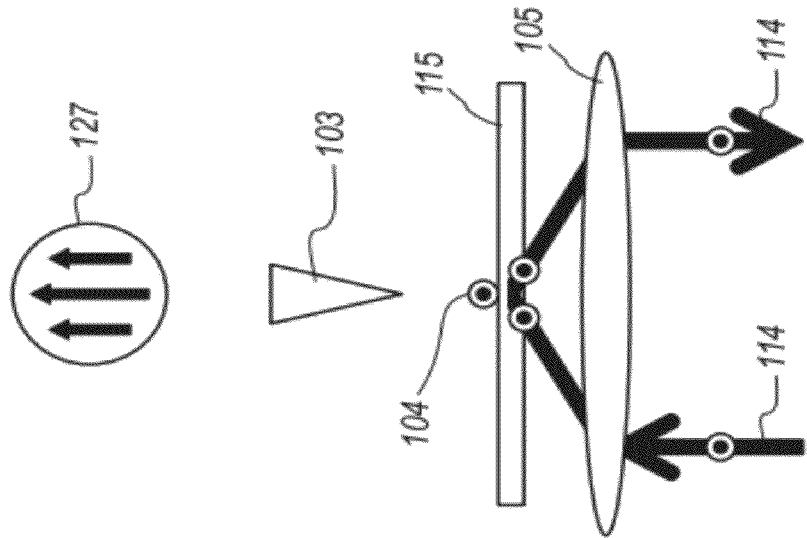
FIG. 3B illustrates the optical microscope of FIG. 3A with a single peripheral light ray, having a different polarization than in FIG. 3A, being passed through a lens and focused adjacent a probe tip, and being reflected back through the lens by a glass slide, and the resultant polarizations of the focused light.
Figure 3A:
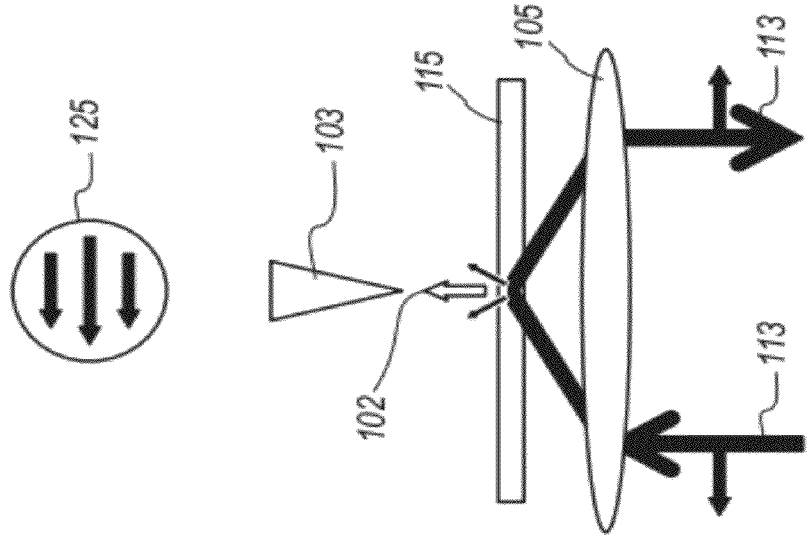
FIG. 3A illustrates an optical microscope system with a single peripheral light ray, having a particular polarizations, being passed through a lens and focused adjacent a probe tip, and being reflected back through the lens by a glass slide, and the resultant polarizations of the focused light.

FIGS. 3A and 3B illustrate another embodiment of the invention herein. FIG. 3A depicts light ray 113 from a light source (not shown). Light ray 113 has linear polarization, as seen at the top of FIG. 3A in a depiction of a cross section of a ray of light 125. In this embodiment, a glass slide 115 is disposed between lens 105 and probe tip 103. After being focused by lens 105, the light ray strikes glass slide 115 at such an angle that total internal reflection occurs and the light ray returns through lens 105. When the light is polarized as it is in light ray 113, the resulting polarization adjacent probe tip 103 is along the axis of probe tip 103 (as demonstrated by arrow 102), thereby creating a region of enhanced optical intensity.

FIG. 3B depicts light ray 114 from a light source (not shown). Light ray 114 also has a linear polarization, as seen at the top of FIG. 3B in a depiction of a cross section of a ray of light 127. However, light ray 114 is polarized at a 90 degree angle from light ray 113 (as can be seen by comparing cross section 127 and cross section 125). In FIG. 3B, when light ray 114 is focused by lens 105 such that it strikes glass slide 115 at such an angle that total internal reflection occurs, the resulting polarization adjacent probe tip 103 is generally transverse the axis of probe tip 103 (as demonstrated by arrow 104 pointing into the plane of the page), thereby removing a region of enhanced optical intensity.

In this embodiment, where glass slide 115 is present and the incident light rays are subject to total internal reflection, only some linearly polarized light will create a region of enhanced optical intensity. Thus, by periodically alternating between different linear polarizations of the light, the high resolution optical scanning described herein can be achieved.

Figure 4A:
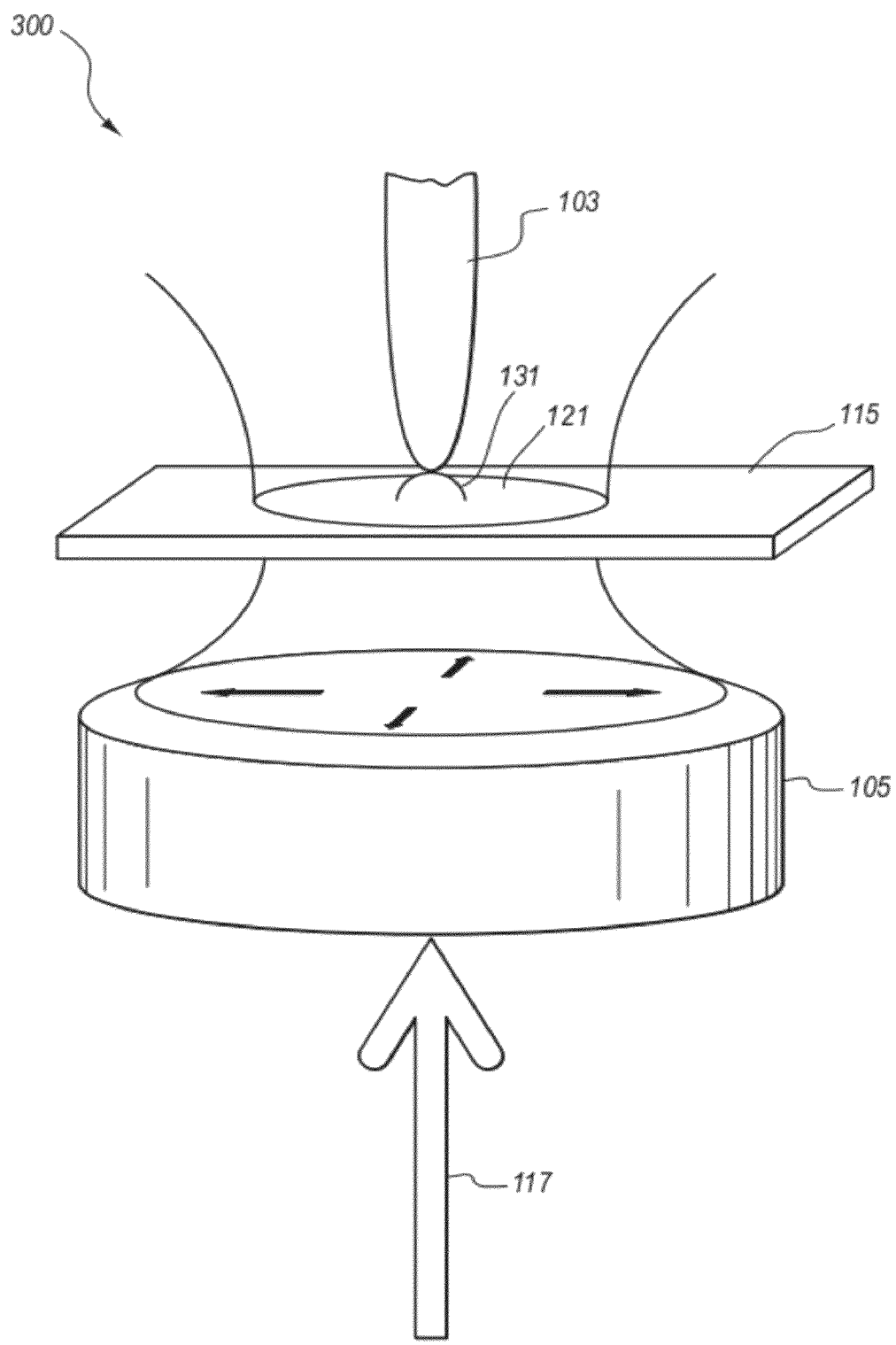
FIG. 4A illustrates an optical microscope system with a region of enhanced optical intensity adjacent a probe tip resulting from the polarization of light being passed through a lens.

FIG. 4A illustrates an optical microscope system 300 with a region of enhanced optical intensity 131 adjacent a probe tip 103. In FIG. 4A, a glass slide 115 is disposed between probe tip 103 and lens 105. On glass slide 115 is a sample 121. Depending on the application, the sample 121 can include a biological sample, quantum dots, fluorescently tagged molecules, fluorescently tagged nano- or micro-structures, arrays or components, and the like. Radially polarized light 117 from a light source (not shown) is passed through lens 105. When the light is focused by lens 105 adjacent probe tip 103 the resulting polarization is along the axis of probe tip 103, thus creating a region of enhanced optical intensity 131.

Figure 4B:
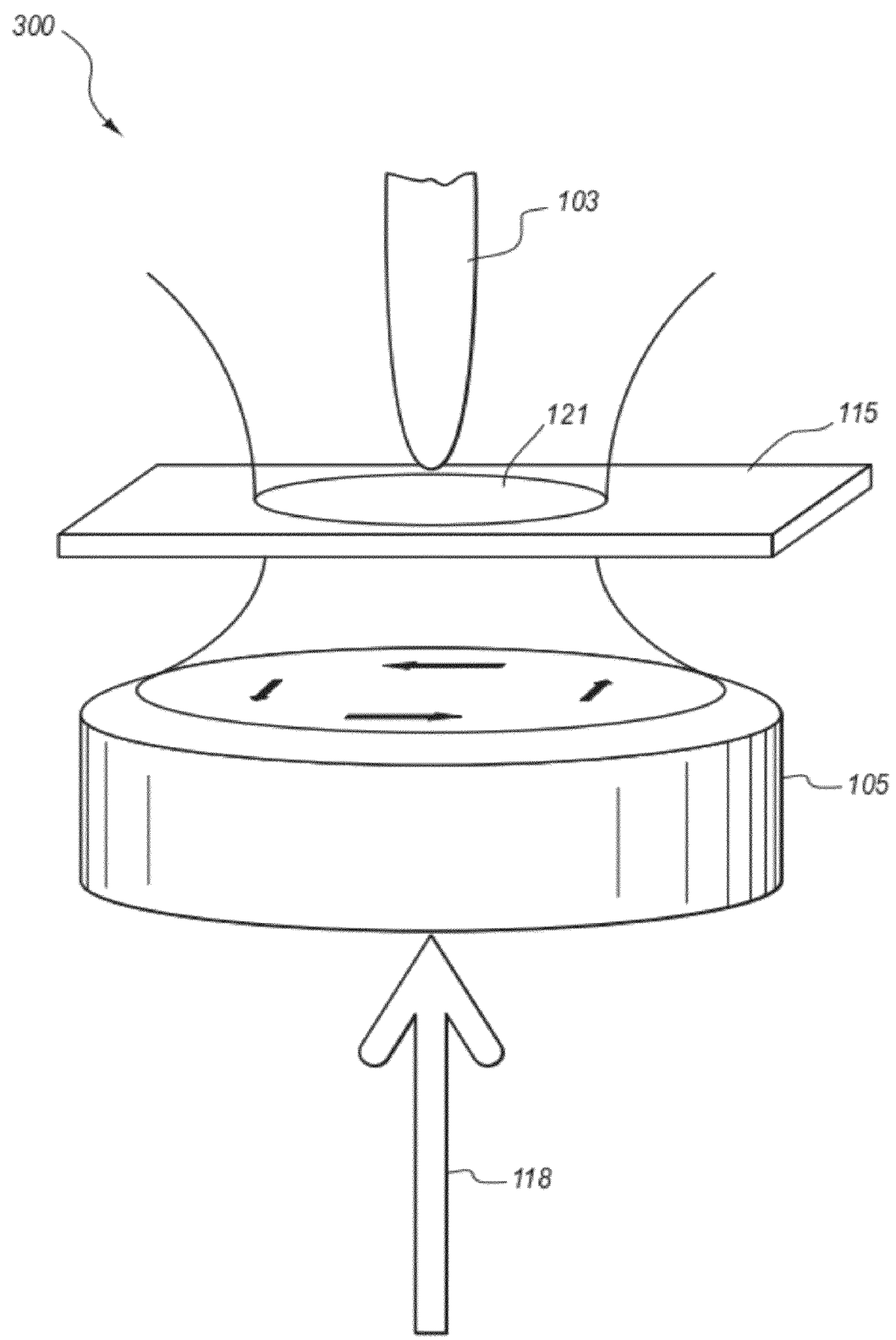
FIG. 4B illustrates the optical microscope system of FIG. 4A with light of a different polarization being focused through the lens, thereby eliminating the region of enhanced optical intensity adjacent the probe tip.

FIG. 4B illustrates the same optical microscope system 300 as in FIG. 4A. In contrast to FIG. 4A, however, there is not a region of enhanced optical intensity adjacent probe tip 103 because the light 118 being passed through lens 105 is azimuthally polarized. After being focused by lens 105 adjacent probe tip 103, the resulting polarization is generally transverse the axis of probe tip 103, and thus no region of enhanced optical intensity is created.

Thus, in this embodiment, where the light incident on the probe tip through the lens 105 is radially polarized, a region of enhanced optical intensity is created. By alternately switching between radial polarization and another form of polarization, such as azimuthal polarization, the high resolution optical scanning described herein can be achieved.

It should be noted that optical microscope system 300 can be configured in other arrangements without departing from the scope of the present invention. By way of non-limiting example, rather than illuminating sample 121 from beneath, sample 121 can be illuminated from the side or from above. In such an arrangement, lens 105 and a light source can be positioned above or to the side of sample 121 such that the light is focused on sample 121 from above or from the side of sample 121. Many samples, and in particular biological samples, are transparent enough to enable viewing or imaging of the samples by passing light through the samples, as illustrated in FIGS. 4A and 4B. However, other samples, such as materials science samples, may be sufficiently opaque that light cannot be passed through them to view or image the sample. Illuminating such samples from the side or from above can enable viewing and imaging of the samples without having to pass light through the samples. Thus, it will be appreciated that the specific arrangement of the microscope system components is not limiting to the present invention so long as the polarization of the illuminating light can be changed to create and remove a region of enhanced light intensity near the sample.

Figure 5:
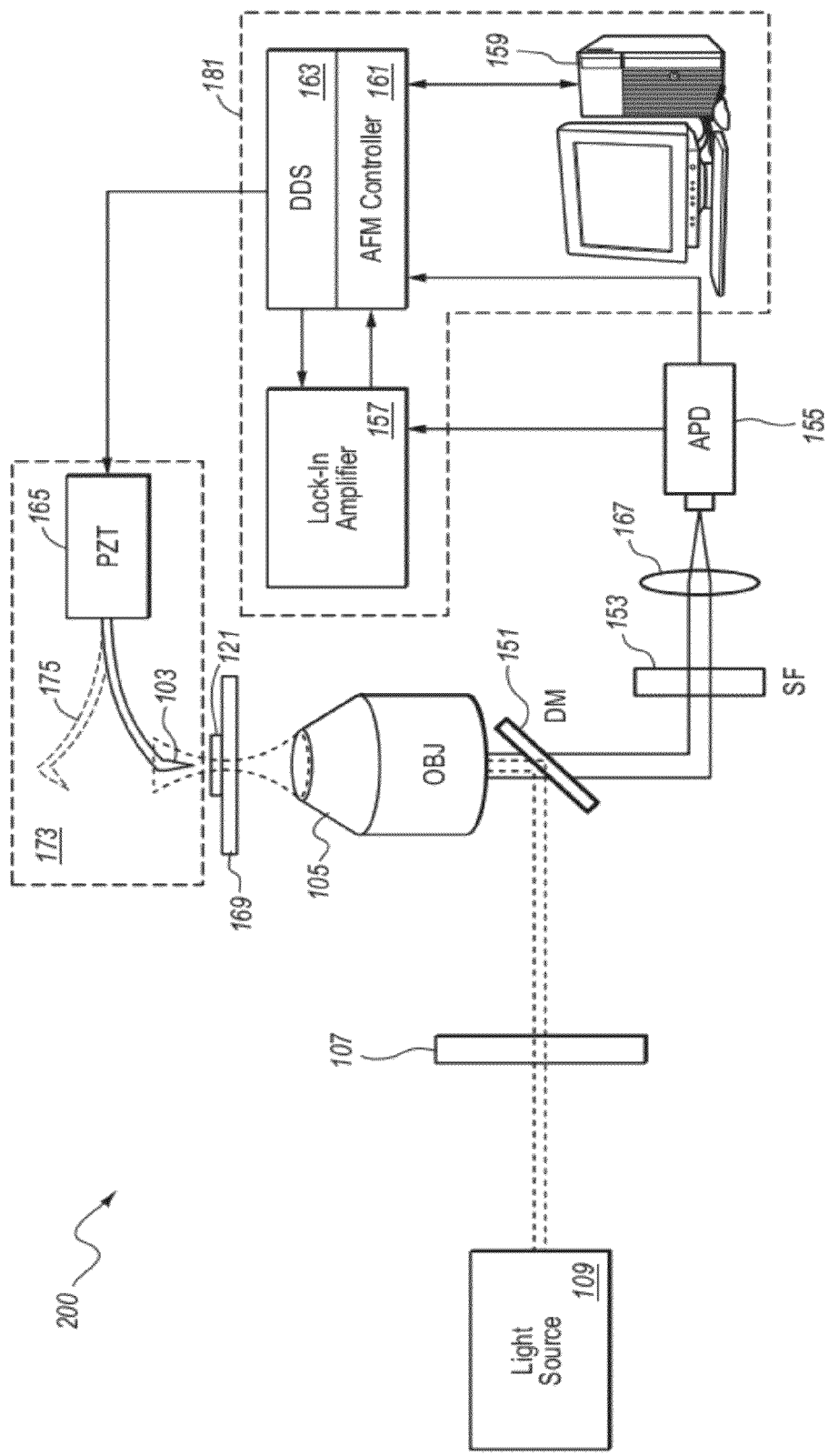
FIG. 5 illustrates an exemplary microscope arrangement that utilizes the invention described herein.

FIG. 5 illustrates an experimental setup that implements an exemplary embodiment of the invention described herein. As shown, the experimental setup 200 includes a sample stage 169 which has x-y-z movement capability. In other words, sample stage 169 is able to be moved both laterally (so that any part of the surface of stage 169 can be located under microscope 173) and up-and-down (so that stage 169 can be positioned at various distances from microscope 173). A sample 121 can be placed on the stage 169 for viewing and imaging. Depending on the application, sample 121 can include a biological sample, quantum dots, fluorescently tagged molecules, fluorescently tagged nano- or micro-structures, arrays or components, and the like. Sample 121 can be in liquids, air, inert gas environments, or in vacuum and at specific temperatures (cryogenic, room temperature, warm to extremely high temperatures), depending on the application.

The system 200 also includes a microscope 173. In one embodiment, microscope 173 is a tapping mode atomic force microscope, but one of ordinary skill in the art would recognize many other types of microscopes that might be employed with this invention, including any scanning probe microscope. Microscope 173 includes various elements, such as probe 103, a cantilever 175 to support probe 103, which is coupled to a piezo-electric stack 165. Such piezo-stack 165 provides for dithering and z-motion (up and down movement over the top of stage 169) of the cantilever. Microscope 173 is also attached to certain control electronics. The control electronics may include a digital synthesizer 163, a microscope controller 161, a personal computer ("PC") 159, a lock-in amplifier 157, and a photon counting system (not shown) (collectively, the "signal acquisition and processing apparatus 181"). Microscope controller 161 is configured to be able to manipulate and control microscope 173 and its properties. PC 159 contains a display for the data. The purpose of the signal acquisition and processing apparatus 181 is to receive data from the microscope 173 and the photodiode 155, process the data, and output the data. In one exemplary embodiment, the data is output on PC 159.

Aligned with probe 103 is microscope objective lens 105. Light from light source 109 (which in a specific embodiment is a green He—Ne laser source) is focused on probe tip 103. The light is directed from light source 109 and is adjusted by way of dichroic mirror 151 through objective lens 105, which focuses the light beam onto probe tip 103. Furthermore, the light from light source 109 passes through a polarizer 107 configured to alternate the emitted light between various polarizations. As the sample is scanned over its surface on stage 169, fluorescence photons emit from sample 121. Such photons pass through objective lens 105, through a bandpass filter 153, and then are detected by avalanche photodiode 155. In one embodiment of the invention, the emitted photons are focused onto the avalanche photodiode 155 by lens 167. The avalanche photodiode 155 is connected to the signal acquisition and processing apparatus 181.

In order to practice an embodiment of the present invention, light from light source 109 is focused by objective lens 105 adjacent to probe tip 103 (which is part of microscope 173). Disposed beneath probe tip 103 is stage 169, which is configured to receive sample 121. While FIG. 5 illustrates sample 121 being illuminated from below, as noted herein, sample 121 can be illuminated from the side or from above. In such an arrangement, light source 109, objective lens 105, and/or associated components (polarizer 107, dichroic mirror 151, etc.) can be positioned above or to the side of sample 121.

Before being focused adjacent probe tip 103, light from light source 109 passes through polarizer 107. Polarizer 107 is configured to alternate the polarization of light between two or more polarizations. The first polarization is one such that after the light from light source 109 is focused by lens 105 adjacent to probe tip 103, the resulting polarization creates a region of enhanced optical intensity adjacent probe tip 103 and sample 121. In the illustrated embodiment, the polarization that creates the enhanced optical intensity is substantially aligned with the longitudinal axis of probe tip 103. As discussed herein, the specific polarization required to create the region of enhanced optical intensity may depend on the shape and configuration of probe tip 103. Thus, in some embodiments, the region of enhanced optical intensity may be created when the polarization is not aligned with a longitudinal axis of probe tip 103.

The polarization can then be alternated to one or more different polarizations which result in a final polarization that removes the region of enhanced optical intensity adjacent probe tip 103 and sample 121. In the illustrated embodiment, the polarization of the light that removes the region of enhanced optical intensity generally transverse to the longitudinal axis of probe tip 103. Depending on the specific configuration of probe tip 103, the region of enhanced optical intensity may be removed even when the polarization of light is aligned with an axis of probe tip 103. By alternating polarizations of the light, this region of enhanced optical intensity is created and removed as probe tip 103 is scanned over sample 121. Signal acquisition and processing apparatus 181 is configured to receive data and create an image of sample 121 as will be understood by one skilled in the art.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical microscope, comprising:
   a light source that generates and emits light having a first intensity;
   a probe tip, wherein the probe tip is disposed within the path of the light from the light source;
   a lens disposed between the light source and the probe tip, wherein the lens focuses the light from the light source adjacent the probe tip; and
   a means for changing a polarization of the light from the light source, wherein the means for changing a polarization alternates the polarization of the light between only a first direction and only a second direction such that the polarization of the light directly alternates between only the first direction and only the second direction, wherein a region of high intensity light that has a greater intensity than the first intensity is created adjacent an end of the probe tip only when the means for changing a polarization of the light polarizes the light in the first direction, and wherein only light of the first intensity is present adjacent the end of the probe tip when the means for changing a polarization of the light polarizes the light in the second direction.

2. An optical microscope as recited in claim 1, wherein the light source comprises a laser.

3. An optical microscope as recited in claim 1, wherein the probe tip comprises an atomic force microscope probe tip.

4. An optical microscope as recited in claim 1, wherein the means for changing a polarization of the light comprises a Pockels cell.

5. An optical microscope as recited in claim 1, wherein the region of high intensity light is created adjacent the end of the probe tip when the polarization of the light is substantially aligned with a longitudinal axis of the probe tip.

6. An optical microscope as recited in claim 1, wherein the means for changing a polarization of the light alternates the polarization of the light by 90 degrees when alternating the polarization between the first direction and the second direction.

7. An optical microscope as recited in claim 1, wherein a glass slide is disposed adjacent to the probe tip.

8. An optical microscope as recited in claim 7, wherein the light incident on the glass slide is subject to total internal reflection.

9. An optical microscope as recited in claim 1, wherein the means for changing a polarization of the light alternates the polarization of the light to alternately create azimuthally and radially polarized light.

10. An optical microscope as recited in claim 1, wherein the first polarization direction of the light is generally aligned with an axis of the probe tip.

11. An optical microscope as recited in claim 1, wherein the second polarization direction of the light is generally perpendicular to an axis of the probe tip.

12. An optical microscope system, comprising:
    a cantilever coupled to a piezo-electric stack, wherein the cantilever has a probe tip coupled thereto, the probe tip having a longitudinal axis;
    a light source that emits light of a first intensity;
    a stage disposed beneath the cantilever, wherein the stage is configured to have a sample disposed thereon;
    a photodiode configured to receive emitted light from the sample;
    an objective lens disposed beneath the stage, wherein the objective lens focuses the light from the light source adjacent the probe tip;
    a dichroic mirror aligned to direct the light from the light source through the objective lens by reflection, the dichroic mirror being further configured to transmit emitted photons from the sample to the photodiode; and
    a light polarization device that changes a polarization of the light from the light source, wherein the light polarization device alternates the polarization of the light between only a first direction and a second direction such that the polarization of the light directly alternates between only the first direction and the second direction in order to substantially immediately create or remove a region of high intensity light adjacent an end of the probe tip, wherein the high intensity light has an intensity greater than the first intensity, wherein the region of high intensity light is created adjacent the end of the probe tip only when the light polarization device polarizes the light in the first direction, and wherein only light of the first intensity is present adjacent the end of the probe tip when the light polarization device polarizes the light in the second direction.

13. An optical microscope system as recited in claim 12, wherein the microscope comprises a tapping mode atomic force microscope.

14. An optical microscope system as recited in claim 12, wherein the photodiode comprises an avalanche photodiode.

15. An optical microscope system as recited in claim 12, further comprising a signal acquisition and processing apparatus.

16. An optical microscope system as recited in claim 15, wherein the signal acquisition and processing apparatus includes a lock-in amplifier.

17. An optical microscope system as recited in claim 15, wherein the signal acquisition and processing apparatus includes a photon counting system.

18. An optical microscope system as recited in claim 15, wherein the signal acquisition and processing apparatus includes a digital synthesizer.

19. An optical microscope system as recited in claim 15, wherein the signal acquisition and processing apparatus includes a microscope controller.

20. An optical microscope system as recited in claim 15, wherein the signal acquisition and processing apparatus includes a personal computer.

21. A method for imaging a sample using detection of photons emitted from the sample, the method comprising:
    locating a tip of a probe near the sample to influence a rate of emission of electromagnetic energy from the sample;
    focusing light having a first intensity adjacent to the tip of the probe; and
    alternating the polarization of the light at a predetermined rate and between only two directions, namely, a direction substantially aligned with the longitudinal axis of the probe tip and a direction that is generally transverse to the longitudinal axis of the probe tip, such that the polarization of the light directly alternates back and forth between the first direction and the second direction in order to alternately and substantially immediately create and remove a region of high intensity light adjacent to the tip of the probe, the region of high intensity light having an intensity that is greater than the first intensity, wherein a region of high intensity light is created adjacent to the tip of the probe only when the light is polarized in the first direction, wherein only light of the first intensity is present adjacent the tip of the probe when the light is polarized in the second direction, and wherein the predetermined rate at which the polarization of the light is alternated affects a rate at which photons are emitted from the sample.

22. The method in claim 21, wherein the polarization of the light is alternated using a Pockels cell.

23. The method in claim 21, wherein the probe tip is oscillated above the sample.

24. The method in claim 21, wherein alternating the polarization of light changes the rate of emission of electromagnetic energy from the sample.

25. The method in claim 21, wherein alternating the polarization of the light between only the two directions results in the light alternating between azimuthally and radially polarized light.

* * * * *